(12) United States Patent
Ghioni et al.

(10) Patent No.: US 9,059,814 B2
(45) Date of Patent: Jun. 16, 2015

(54) MODULAR OPTICAL PATCH PANEL

(75) Inventors: Lorenzo Ghioni, Casalmaiocco (IT);
Maurizio Gazzola, Milan (IT); Ronald Johnson, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 696 days.

(21) Appl. No.: 13/363,679

(22) Filed: Feb. 1, 2012

(65) Prior Publication Data

US 2013/0195451 A1 Aug. 1, 2013

(51) Int. Cl.
*H04J 14/02* (2006.01)
*H04B 10/00* (2013.01)

(52) U.S. Cl.
CPC ......... *H04J 14/0212* (2013.01); *H04J 14/0217* (2013.01); *H04J 14/0219* (2013.01)

(58) Field of Classification Search
CPC .. H04J 14/021; H04J 14/0217; H04J 14/0219
USPC .......................................................... 398/83
See application file for complete search history.

(56) References Cited

U.S. PATENT DOCUMENTS

| 7,983,558 | B1 | 7/2011 | Gerstel et al. | |
|---|---|---|---|---|
| 2008/0205819 | A1* | 8/2008 | Johnson et al. | 385/17 |
| 2009/0034978 | A1* | 2/2009 | Gazzola et al. | 398/83 |
| 2011/0299822 | A1* | 12/2011 | Barry et al. | 385/135 |
| 2011/0299850 | A1* | 12/2011 | Gerstel et al. | 398/49 |

OTHER PUBLICATIONS

Shankar et al., "Multi-degree ROADM based on wavelength selective switches: Architectures and scalability", Optics Communications 279 (2007), pp. 94-100.
Cisco Systems, "Reconfigurable Optical Add/Drop Multiplexing Portfolio for the Cisco ONS 15454 Multiservice Transport Platform", Cisco Systems, Inc., (1992-2005) pp. 1-9.
Gringeri et al., "Flexible Architectures for Optical Transport Nodes and Networks", IEEE Communication Magazine, Jul. 2010, pp. 40-50.

* cited by examiner

*Primary Examiner* — Daniel Dobson
(74) *Attorney, Agent, or Firm* — Edell, Shapiro & Finnan LLC

(57) ABSTRACT

A scalable, modular optical mesh patch panel includes a multi-slot receptacle configured to receive at least one of a first modular optical interconnect block and a second modular optical interconnect block that enable connectivity among one or more add-drop modules and/or respective degrees of a reconfigurable optical add drop multiplexer node (ROADM).

20 Claims, 8 Drawing Sheets

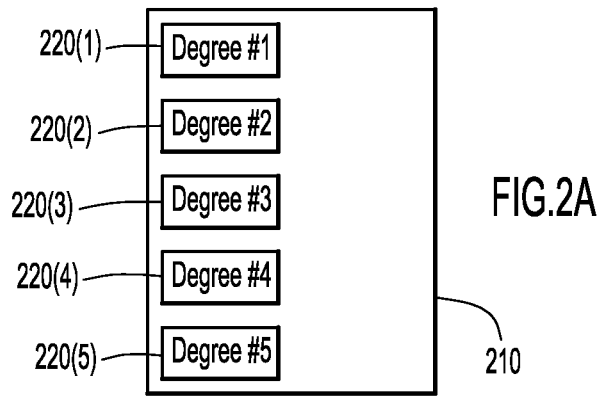
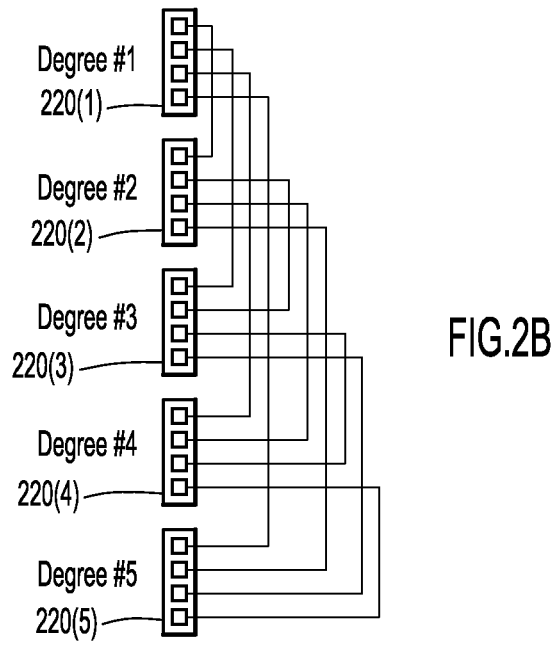

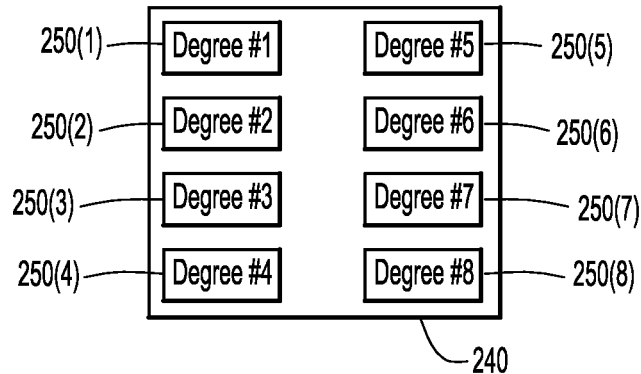
FIG.3A
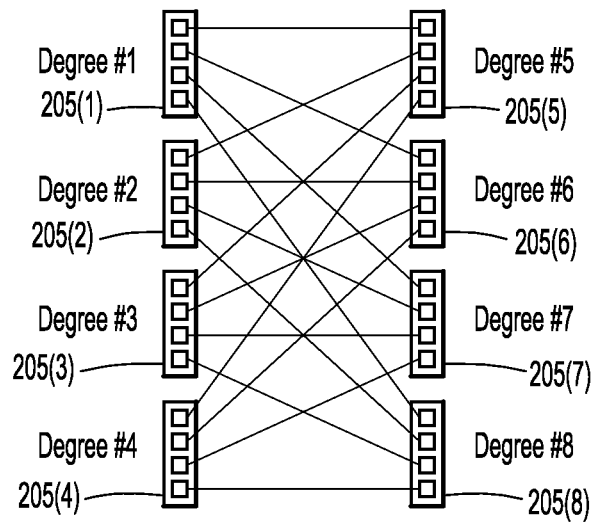
FIG.3B
| | F | | G | | H | | I | |
|---|---|---|---|---|---|---|---|---|
| A | TX | A | TX | A | TX | A | TX |
| | RX | | RX | | RX | | RX |
| B | TX | B | TX | B | TX | B | TX |
| | RX | | RX | | RX | | RX |
| C | TX | C | TX | C | TX | C | TX |
| | RX | | RX | | RX | | RX |
| D | TX | D | TX | D | TX | D | TX |
| | RX | | RX | | RX | | RX |
FIG.3C

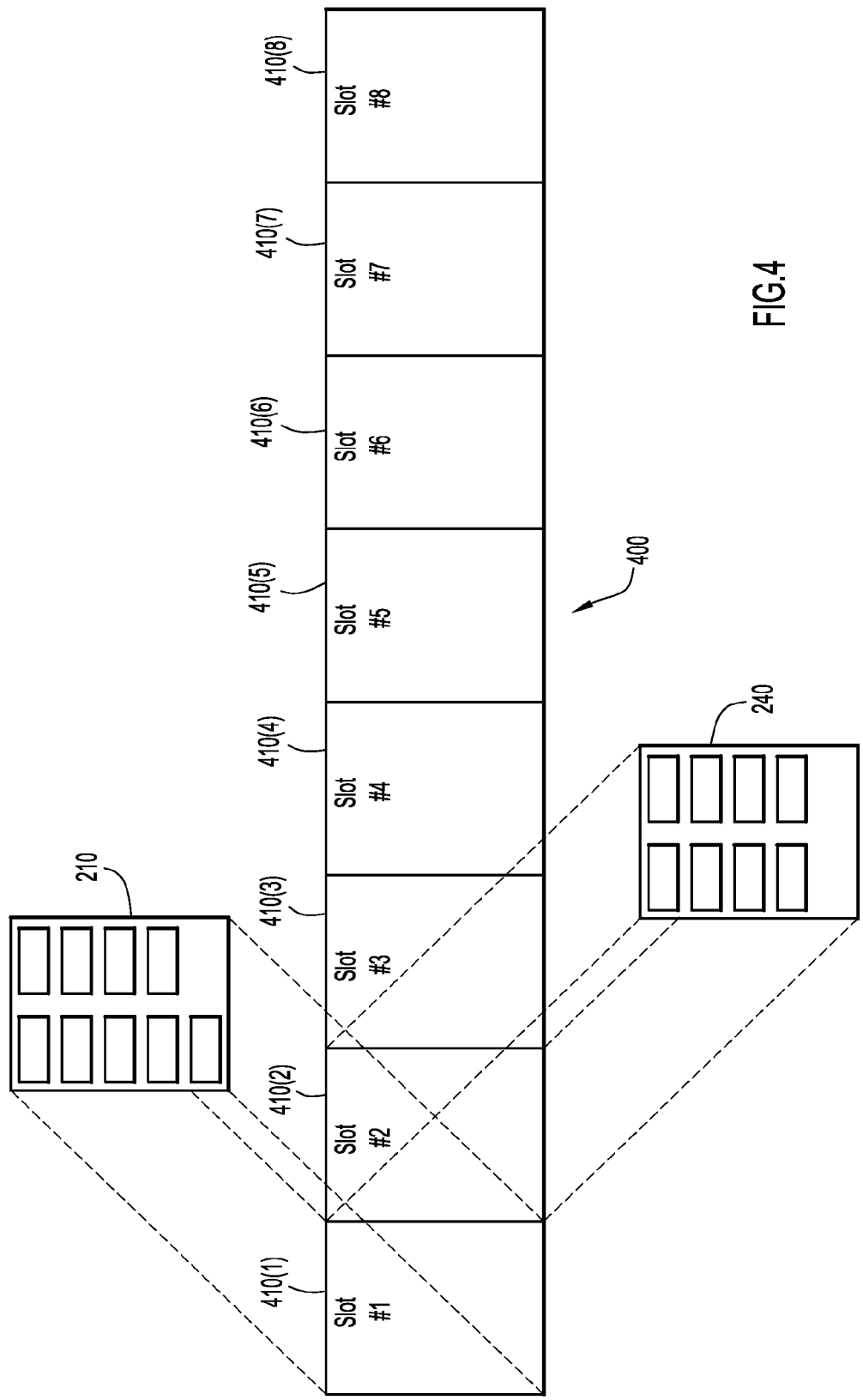

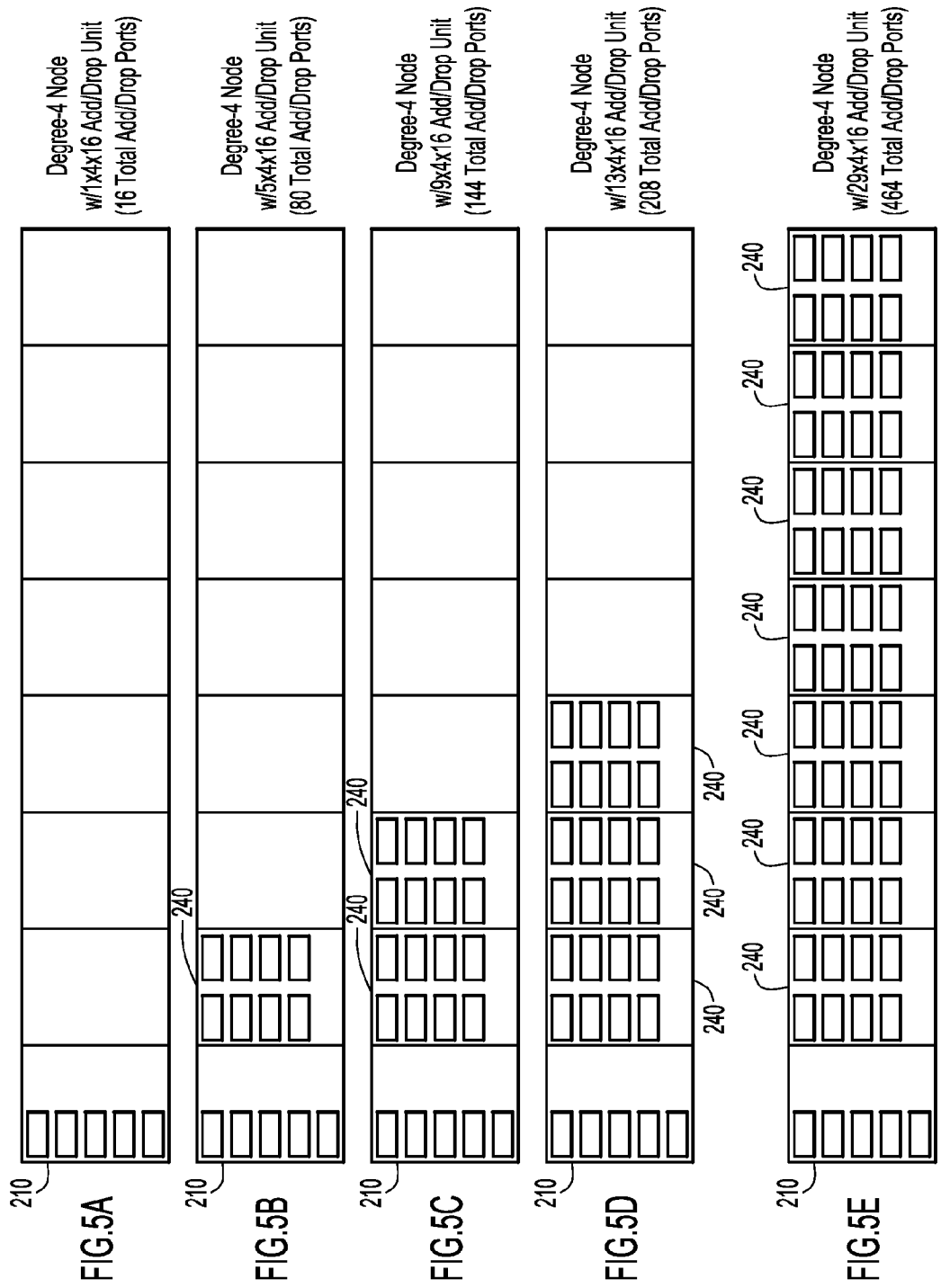

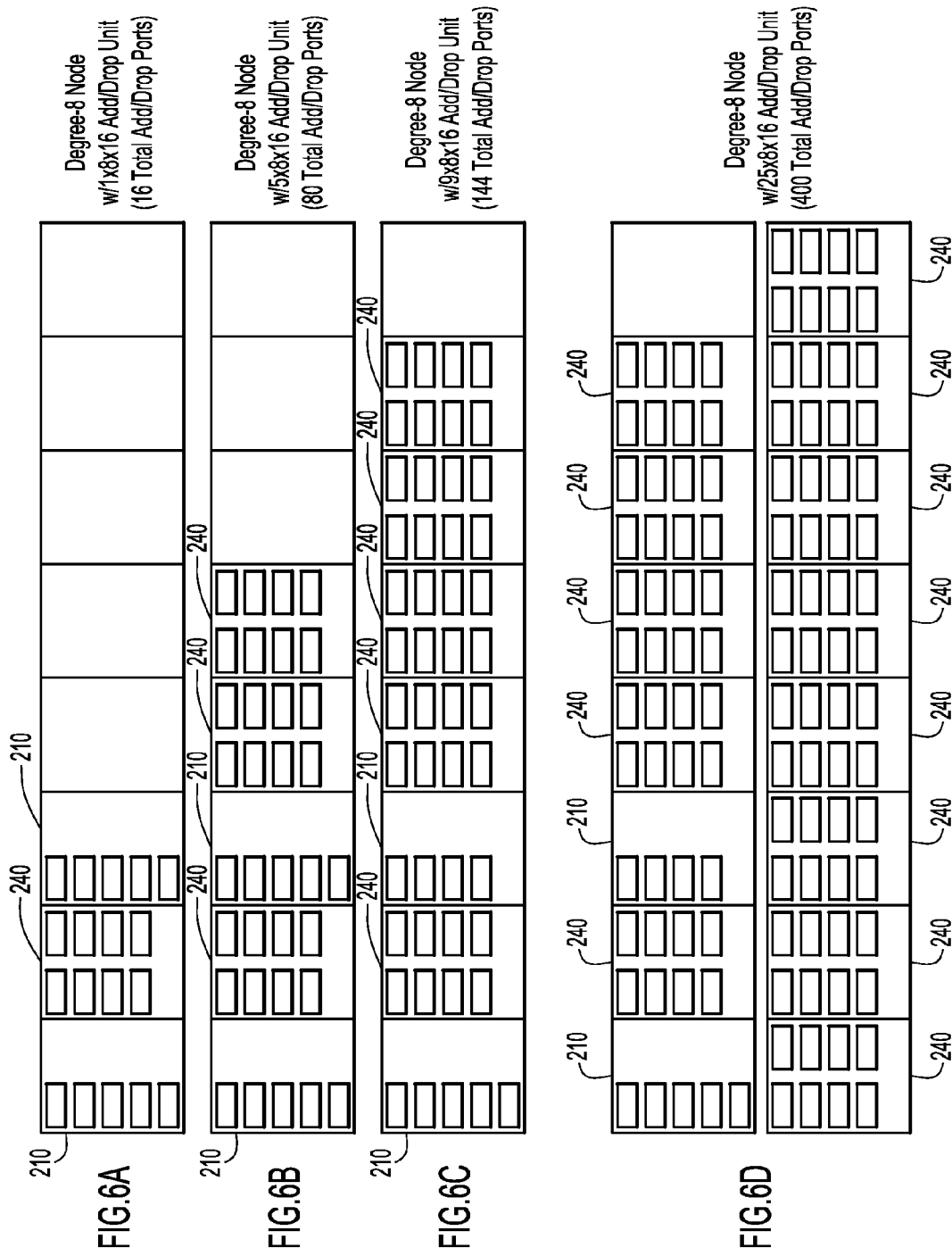

MODULAR OPTICAL PATCH PANEL

TECHNICAL FIELD

The present disclosure relates to optical networking.

BACKGROUND

An optical add-drop multiplexer (OADM) node comprises a collection of optical and control devices used in wavelength-division multiplexing systems for multiplexing and routing different channels of light into or out of, e.g., one or more multiple single mode fibers (SMFs). The terms "add" and "drop" in the context of an OADM node refer to the capability of the OADM node to add one or more new wavelengths, channels or colors to an existing multi-wavelength wavelength division multiplexed (WDM) or dense WDM (DWDM) signal, and/or to drop (remove) one or more channels from the WDM or DWDM signal. An OADM node may be considered to be a specific type of optical cross-connect.

A reconfigurable OADM (ROADM) node is a form of OADM node that includes the ability to remotely switch or control traffic in a DWDM system, e.g., via software control (whereas OADM nodes are considered to have fixed add/drop capabilities with respect to, e.g., colors or direction). As such, a ROADM node enables increased flexibility in network transport by allowing a telecommunications provider to add or drop any channel, under remote control. In this way, a ROADM node allows for very flexible, remote selection and routing of wavelengths transiting a given node on a fiber network. Similarly, a ROADM node may also allow flexible access to any of the wavelengths going through the node for use of the data on the chosen wavelength and the possibility of adding to, or modifying, the data on that wavelength for transmitting it on to the next node(s). A ROADM node may also allow the interconnection of multiple intersecting networks (multiple degree nodes) at the optical level, avoiding the expense and complexity of optical-electrical-optical conversions to achieve the interconnection. Thus, as the demand in a given network changes, additional or different channels can be dropped or added, under remote control, creating a flexible optical network provisioning system.

BRIEF DESCRIPTION OF THE DRAWINGS

FIG. 2A depicts a faceplate of a first modular block that can be employed in the modular patch panel.

FIG. 2B depicts the connectivity among the optical ports of the first modular block.

FIG. 2C depicts a chart showing how the different ports are grouped in an optical connector for the first modular block.

FIG. 3A depicts a faceplate of a second modular block that can be employed in the modular patch panel.

FIG. 3B depicts the connectivity among the optical ports of the second modular block.

FIG. 3C depicts a chart showing how the different ports are grouped in an optical connector for the second modular block.

FIG. 4 shows an example schematic arrangement of the first and second modular blocks in the modular patch panel.

FIGS. 5A-5E show different arrangements of the first and second modular blocks in the modular patch panel.

FIGS. 6A-6D show still other arrangements of the first and second modular blocks in the modular patch panel.

DESCRIPTION OF EXAMPLE EMBODIMENTS

Overview

A scalable, modular optical mesh patch panel is provided including a multi-slot receptacle that is configured to receive one or more of a first modular optical interconnect block and one or more of a second modular optical interconnect block. The first modular optical interconnect block may be disposed in one slot of the multi-slot receptacle, and comprises a plurality of optical ports, wherein each one of the optical ports of the first modular optical interconnect block is, respectively, in optical communication with each of the other optical ports of the first modular optical interconnect block. The second modular optical interconnect block may be disposed in a second slot of the multi-slot receptacle, and comprises a plurality of optical ports, wherein the plurality of optical ports of the second modular optical interconnect block are divided into a first group of optical ports and a second group of optical ports, wherein each one of the optical ports in the first group of optical ports is in communication with each one of the optical ports in the second group of optical ports, and each one of the optical ports in the second group of optical ports is in communication with each one of the optical ports in the first group of optical ports. Such a modular optical patch panel, using only the aforementioned first and second modular blocks, can support various configurations of multi-degree optical nodes, including multiple add/drop multiplexer modules.

Example Embodiments

Figure 1:
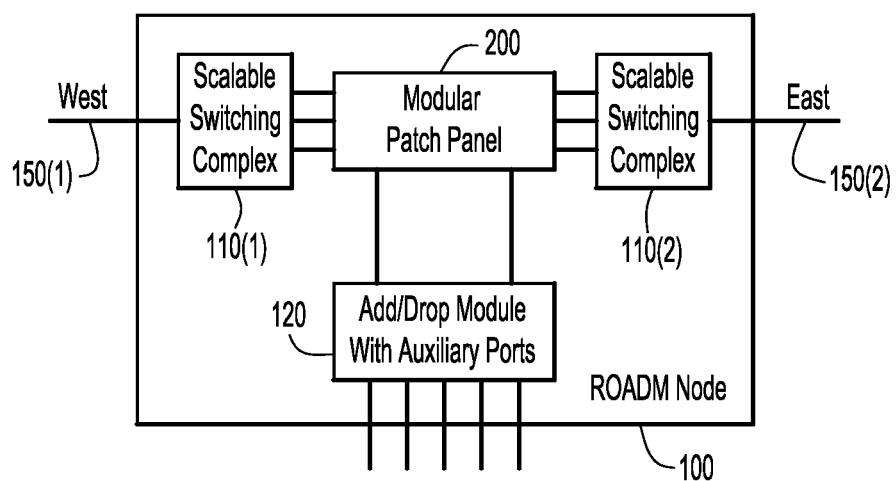
FIG. 1 depicts a ROADM node including a modular patch panel.

FIG. 1 depicts a ROADM node 100 including scalable switching complexes 110(1) and 110(2), a contentionless add/drop multiplexer or module 120, and a modular optical patch panel 200 (also referred to herein as "modular patch panel" or "mesh patch panel"). More specifically, ROADM node 100 includes scalable switching complex 110(1) that faces a "west" direction and splitter/coupler module 110(2) that faces an "east" direction. An optical fiber 150(1), such as a single mode fiber (SMF), may be connected to the ROADM node's west facing direction. This optical fiber 150(1) may carry a wave division multiplexed (WDM) or dense (DWDM) optical signal comprising a plurality of wavelengths, channels or colors (hereinafter, collectively, "channels"). Optical fiber 150(1) may carry channels towards the ROADM node 100, and likewise may carry channels away from ROADM node 100. For purposes of this disclosure, scalable switching complexes 110 may be considered to be components that receive an optical signal from, e.g., optical fiber 150(1), and provide multiple optical signals comprising one or more channels at respective output ports. Scalable switching complexes 110 may also be configured to receive multiple optical signals over one or more ports and to couple these signals for output via, e.g., optical fiber 150(1).

A similar optical fiber 150(2) may be in communication with scalable switching complex 110(2). Optical fiber 150(2) may carry channels to and from the east direction. These channels may also be added to or dropped by the add/drop module 120. Those skilled in the art will appreciate that FIG. 1 does not show, for example, optical amplifiers, associate with the splitter/coupler modules 110, that may be used to amplify optical signals received at the ROADM node 100 or transmitted from the ROADM node 100.

One or more of the multiple channels being carried by optical fibers 150(1), 150(2) may be dropped at ROADM node 100 via add/drop module 120. Likewise, one or more channels can be added to the optical fibers 150(1), 150(2) for transmission to another optical node, as long as that channel is not already in use.

In this configuration, ROADM node 100 is a ROADM node having two degrees, where each degree represents a direction to which the node may connect. As the number of degrees and individual channels that can be handled by individual optical fibers in the ROADM node 100 grows, it becomes difficult to manage the connectivity among the scalable switching complexes 110 and the add/drop module 120. The modular optical patch panel 200 enables simplified optical connectivity among the several optical components in the ROADM node 100 by, as will be explained below in detail, using one or more preconfigured modular optical interconnect modules or blocks or "modular blocks" in one of a plurality of arrangements that provide immediate optical connectivity among the several optical components, even as the number of such components grows.

As mentioned, in the case of the example ROADM node 100 of FIG. 1, there are only two degrees. However, those skilled in the art will appreciate that the number of degrees in a ROADM node is not limited and is, instead, dependent on the desired number of incoming and outgoing optical fibers 150. Indeed, some ROADM nodes may have on the order of tens of degrees. ROADM nodes of that caliber, however, can be very expensive to deploy, and in many cases, a given telecommunication provider may not need to deploy a ROADM node with infrastructure to support a degree number of that magnitude in early phases of an optical network build out. For example, during the early stages of an optical network build out, perhaps only a four degree ROADM node would be sufficient to support the desired connectivity. However, at some subsequent time, additional degrees may be desired. Embodiments described herein provide a mesh patch panel 200 that enables a modular approach to growth of an optical node, such as a ROADM node.

FIG. 2A depicts an example faceplate of a first modular block 210 that can be employed in modular patch panel 200. First modular block 210 includes, in this embodiment, 5 optical ports 220(1)-220(5). In one possible implementation, the optical ports 220 may be configured to receive an MPO-type connector that can support a fiber optic ribbon cable having, e.g., eight individual optical fibers, where each fiber can be configured to carry one or more channels. First modular block 210 can be received in, e.g., a rack mounted receptacle 400 as shown schematically in FIG. 4.

FIG. 2B depicts the connectivity among the optical ports 220(1)-220(5) of the first modular block 210. As shown, optical port 220(1) is in optical communication with each of optical ports 220(2)-220(5). Optical port 220(2) is in optical communication with each of optical ports 220(1) and 200(3)-220(5). Optical port 220(3) is in optical communication with each of optical ports 220(1)-220(2) and 200(4)-220(5). Optical port 220(4) is in optical communication with each of optical ports 220(1)-220(3) and 220(5). And optical port 220(5) is in optical communication with each of optical ports 220(1)-220(4).

FIG. 2C depicts a chart showing the foregoing optical connectivity among the optical ports 220 of the first modular block 210. In FIG. 2C, the letters along the top border of the chart correspond to the different degrees supported by first modular block 210. Thus, letter A corresponds with Degree #1 shown in FIGS. 2A and 2B. Letter B corresponds with Degree #2. Letter C corresponds with Degree #3. Letter D corresponds with Degree #4. And, letter E corresponds with Degree #5 (or may instead correspond with an add/drop module). As shown in the chart of FIG. 2C, each degree is configured to be in optical communication with each of the other degrees (or optical ports) of the first modular block 210. Moreover, each degree or optical port 220 supports channels being transmitted (TX) from the given optical port and received (RX) at the given optical port. More specifically, the chart of shown in FIG. 2C represents a possible way of grouping ports in a same MPO-type connector such that desired connectivity among the ports can be achieved.

The chart of FIG. 2C may be considered to be a columnar list that represents the optical connectivity supported by first modular block 210. Thus, looking at column/degree A, that column (or degree) is shown to be in optical communication with degrees B, C, D and E (i.e., Degrees 2, 3, 4, and 5).

Assuming each optical port 220 is configured to receive an MPO-type connected as mentioned above, then each optical port 220 may, for instance, be configured to support four transmit channels and four receive channels, for a total of eight channels (or individual fibers which might actually simultaneously carry multiple channels).

Figure 2D:
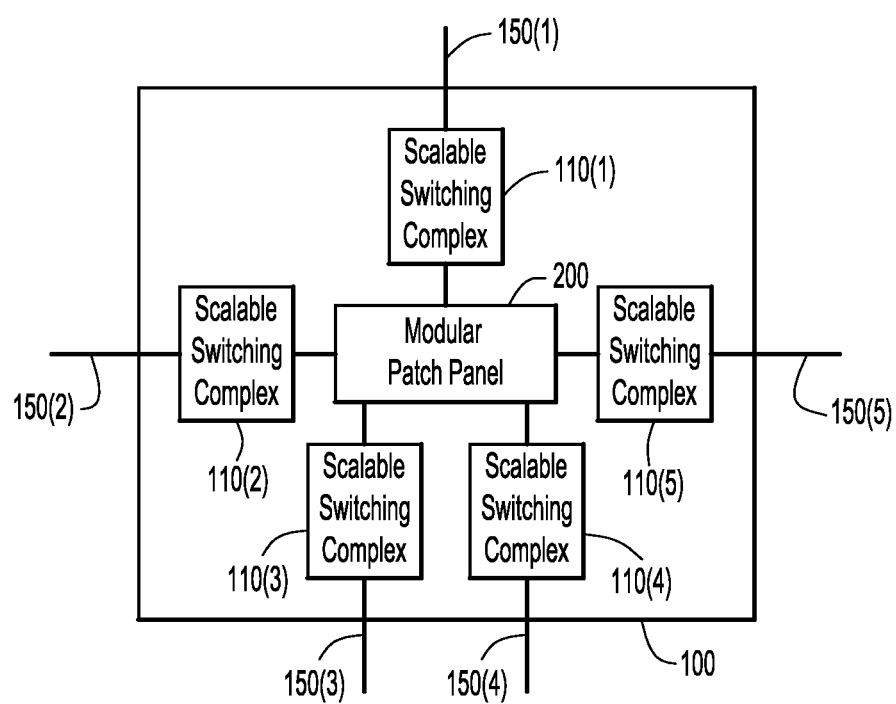
FIG. 2D shows a use case of the first modular block.

First modular block 210 may be considered to be a basic building block for mesh patch panel 200. In particular, first modular block 210 may be used to support a 5-degree node without an add/drop module 120. Such a configuration is shown in FIG. 2D. In such a case, five scalable switching complexes 110(1)-110(5) are arranged in a node. Without the add/drop functionality, all of the channels may be considered "express" channels. That is, the channels received over any one of the optical fibers 150(1)-150(5) can be expressly routed to each of the other optical fibers as a result of the connectivity provided by first modular block 210.

More specifically, assume again that 8-fiber ribbon cables are used to interconnect an input/output port of scalable switching complex 110 with a respective degree port 220 on the first modular block 210. With such interconnections, each scalable switching complex 110 can supply four individual optical signals (which may comprises multiple channels or selected bandwidths) to the first modular block 210, and can receive four individual channels from the first modular block 210. The supplied channels are automatically routed to each of the other scalable switching complexes 110 via the internal interconnection provided by the first modular block and the channels received from the first modular block 210 can be received from any of the scalable switching complexes 110.

Figure 2E:
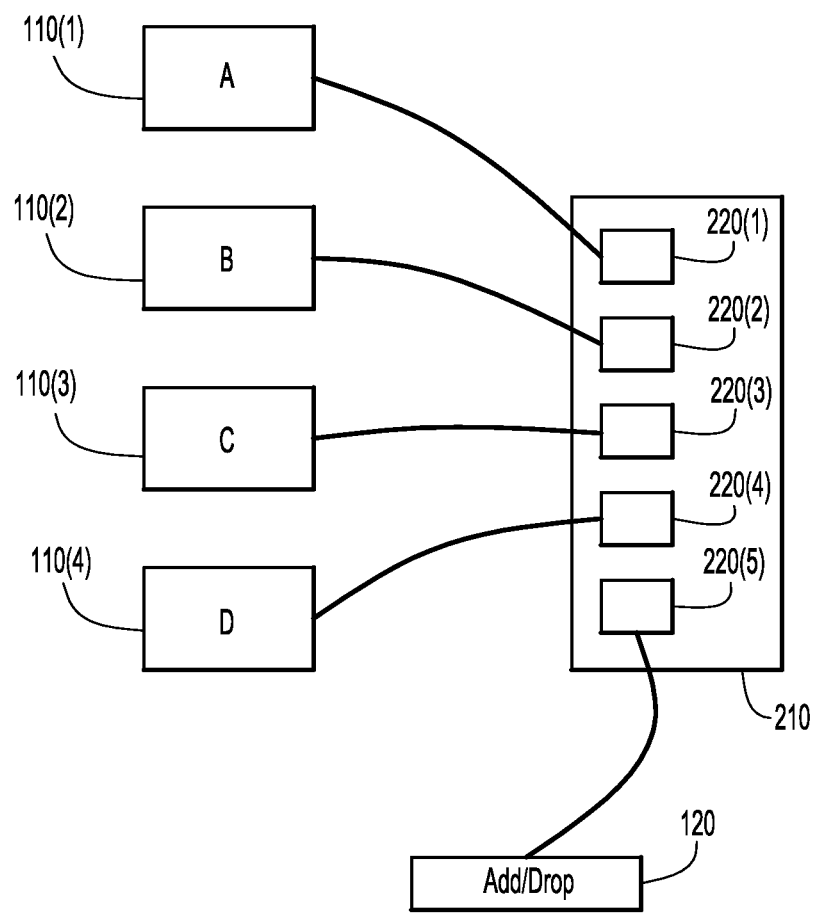
FIG. 2E shows another use case of the first modular block.

Alternatively, first modular block 210 can be used to, e.g., support a 4-degree ROADM node with, e.g., one 4×16 add/drop module 120. This arrangement is depicted in FIG. 2E. The M×N nomenclature for the add/drop module 120 refers to the number M of degrees the add/drop module 120 can support and the number N of individual channels that can be added or dropped by the add/drop module 120. From a connectivity perspective, Degree #5 (Letter E) could be used as the port via which the add/drop module 120 may be connected to the mesh patch panel 200.

Referring now to FIG. 2E, each connection line between components may be, as indicated above, an 8-fiber ribbon cable that terminates on both ends with an MPO-type connector. Such an 8-fiber ribbon cable can support four transmit and four receive fibers. Thus, in accordance with the functionality provided by first modular block 210, when a first port of Degree-A 110(1) ("Port 1") (of, e.g., four ports of 16 transmit ports and four ports of 16 receive ports) is connected with Port 220(1) of the first modular block 210, the following example connectivity is established:

Fiber #1-TX on Port #1 connected with Fiber #1-RX on Port 220(2)

Fiber #2-TX on Port #1 connected with Fiber #1-RX on Port 220(3)

Fiber #3-TX on Port #1 connected with Fiber #1-RX on Port 220(4)

Fiber #4-TX on Port #1 connected with Fiber #1-RX on Port 220(5)

Fiber #1-RX on Port #1 connected with Fiber #1-TX on Port 220(2)

Fiber #2-RX on Port #1 connected with Fiber #1-TX on Port 220(3)

Fiber #3-RX on Port #1 connected with Fiber #1-TX on Port 220(4)

Fiber #4-RX on Port #1 connected with Fiber #1-TX on Port 220(5)

The connectivity provided by the first modular block 210 thus enables connectivity To/From each of the units/degrees connected with the first modular block 210. Those skilled in the art will appreciate that the above list of connectivities only captures the connectivity of a given port ("Port 1") of Degree A with ports or other degrees. The connectivities of the other degrees are not listed but can be easily gleaned using the foregoing list as a guide.

FIG. 3A depicts an example faceplate of a second modular block 240 that can be employed in modular patch panel 200 in combination with first modular block 210. Second modular block 240 includes, in this embodiment, eight optical ports 250(1)-250(8). In one possible implementation, and like the first modular block 210, the optical ports 250 in the second modular block 240 may be configured to receive an MPO-type connector that can support a fiber optic ribbon cable having, e.g., eight individual optical fibers, where each fiber can be configured to carry one or more channels. Second modular block 240 can also be received in, e.g., rack mounted receptacle 400 as shown schematically in FIG. 4.

FIG. 3B depicts the connectivity among the optical ports 250(1)-250(8) of the second modular block 240. As shown, optical port 250(1) is in optical communication with each of optical ports 250(5)-250(8). Optical port 250(2) is in optical communication with each of optical ports 250(5)-250(8). Optical port 250(3) is in optical communication with each of optical ports 250(5)-250(8). And optical port 250(4) is in optical communication with each of optical ports 250(5)-250(8).

Similarly, optical port 250(5) is in optical communication with each of optical ports 250(1)-250(4). Optical port 250(6) is in optical communication with each of optical ports 250(1)-250(4). Optical port 250(7) is in optical communication with each of optical ports 250(1)-250(4). And optical port 250(8) is in optical communication with each of optical ports 250(1)-250(4).

FIG. 3C depicts a chart showing a possible way of grouping ports in a same MPO-type connector such that the desired connectivity among the ports can be achieved. In FIG. 3C, the letters along the borders correspond to the different degrees supported by second modular block 210. Thus, letter A corresponds with Degree #1 shown in FIGS. 3A and 3B. Letter B corresponds with Degree #2. Letter C corresponds with Degree #3. And Letter D corresponds with Degree #4.

Still referring to FIG. 3C, Letter F corresponds with Degree #5, Letter G corresponds with Degree #6, Letter H corresponds with Degree #7, and Letter I corresponds with Degree #8. With such a configuration, there is full mesh interconnection between any connected port.

The chart of FIG. 3C may be considered to be a columnar list that represents the optical connectivity supported by second modular block 240. Thus, looking at, for example, column/degree F, that column is shown to be in optical communication with rows A, B, C and D (i.e., Degrees 1, 2, 3 and 4), consistent with the example above where F might be in communication with E (the add/drop module connection point in the example) via any of A, B, C or D (i.e., Ports 220(1)-220(4), which correspond to Ports 250(1)-250(4))).

Assuming each optical port 250 is configured to receive an MPO-type connected as mentioned above, then each optical port 250 may, for instance, be configured to pass four transmit signals (which may comprise multiple channels) and four receive signals (which likewise may comprise multiple channels), for a total of eight signals (or individual fibers which might actually simultaneously carry multiple channels).

Second modular block 240 may be considered to be an "upgrade" building block for mesh patch panel 200 (in comparison to the basic first modular block 210). In particular, second modular block 240 allows full mesh interconnection between a given one of the ports in a first group of ports (e.g., 250(1)-250(2)) and any of a second group of ports (e.g., 250(5)-250(8)). As will be explained below, the second modular block 240 can be used to expand the number of add/drop ports or the number of node degrees (or both).

This expansion of the number of add/drop ports or the number of node degrees can be achieved, in accordance one implementation, by adding the second modular block 240 to, e.g., rack mounted receptacle 400 shown in FIG. 4 and making the appropriate optical fiber ribbon cable connections between the degrees/second modular block and add-drop units/second modular block.

In particular, FIG. 4 shows an example schematic arrangement of the first and second modular blocks 210, 240 in the modular patch panel 200, which in this case is implemented with a multi-slot receptacle 400. In this particular example, eight slots 410(1)-410(8) are provided. These slots 410 can be populated in an appropriate manner when there is a desire to increase the number of add/drop ports or the number degrees supported by a given ROADM node.

Specifically, FIGS. 5A-5E show different arrangements of the first and second modular blocks 210, 240 of the modular patch panel 200 disposed in receptacle 400. In FIG. 5A only slot #1 of receptacle 400 is populated with a first modular block 210. This configuration, as explained earlier, can support a 4-degree node with, e.g., a single 4×16 add/drop module 120 (i.e., 16 total add/drop ports). The use of a single first modular block 210 can also support a 5-degree node without add/drop capability, as shown in, e.g., FIG. 2D. FIG. 5B shows a configuration in which slots #1 and #2 of receptacle 400 are populated. Slot #1 includes one first modular block 210, and slot #2 includes one second modular block 240. In this configuration a 4-degree node with five 4×16 add/drop modules 120 can be supported. Such a node would support 80 total add/drop ports (i.e., 5 add/drop modules, each having 16 add/drop ports).

FIG. 5C depicts an arrangement in which slots #1-3 of receptacle 400 are populated. In this case, slot #1 includes a first modular block 210, and slot #2 and slot #3 each includes a second modular block 240. Such a configuration supports a 4-degree node with nine 4×16 add/drop modules 120 (for a total of 144 add/drop ports). FIG. 5D, as compared to FIG. 5C, adds yet another second modular block 240 to the receptacle 400. In such a configuration, a ROADM node might support 4-degrees with 13 4×16 add/drop modules 120 (for a total of 208 add/drop ports).

FIG. 5E depicts a fully populated 8-slot receptacle 400, in which the first slot is populated with a first modular block 210, and slots #2-8 are populated with second modular blocks 240. With such a configuration, a 4-degree node with 29 4×16 add/drop modules 120 can be supported (for a total of 464 add/drop ports).

Thus, FIGS. 5A-5E show different possible configuration in which a single first modular block 210 is employed with an increasing number of second modular blocks 240. The increasing number of second modular blocks 240 enables an increased number of add/drop modules to be connected to the mesh patch panel 200. By enabling the mesh patch panel 200 to be grown in this modular fashion, an optical network provider can deploy an appropriately sized patch panel for a given application.

FIGS. 6A-6D show still other arrangements of the first and second modular blocks 210, 240 of the modular patch panel 200 in receptacle 400. In the arrangements shown in FIGS. 6A-6D, two first modular blocks 210 are employed among one or more second modular blocks 240, thus supporting full mesh interconnection for an 8-degree optical node. More specifically, and referring to FIG. 6A, two first modular blocks 210 and one second modular block 240 populate the first three slots of receptacle 400. Such an arrangement supports an 8-degree node including one 8×16 add/drop module (for a total of 16 add/drop ports).

In FIG. 6B, two additional second modular blocks 240 are added to the receptacle 400. This configuration supports an 8-degree node with five 8×16 add/drop modules 120 (for a total of 80 add/drop ports).

In FIG. 6C, another two second modular blocks are added to the receptacle 400 (as compared to the configuration shown in FIG. 6B). With the configuration of FIG. 6C, an 8-degree node can be supported along with nine 8×16 add/drop modules 120 (for a total of 144 add/drop ports).

FIG. 6D shows a configuration in which two receptacles 400 are employed. In the configuration shown, two first modular blocks 210 and 13 second modular blocks 240 are used, leaving only a single slot of one of the receptacles 400 free. With such a configuration, an 8-degree node with 25 8×16 add/drop modules can be supported (for a total of 400 add/drop ports).

As those skilled in the art will appreciate, by providing and leveraging modular connection blocks configured as the first modular block 210 and the second modular block 240, it is possible to expand the connectivity to additional add/drop ports such that a ROADM node can be easily re-configured to support increased add/drop capability. The modular configuration of the mesh patch panel 200 also enables the patch panel 200 to be relatively easily re-configured to support an increased number of degrees in the ROADM node.

As explained, the first modular block includes a plurality of optical ports, wherein each optical port supports a plurality of individual optical receive signals and a plurality of individual optical transmit signals, such that the first modular block is able to interconnect, in a first configuration, up to five degrees of an optical node and, in a second configuration, up to four degrees of an optical node and an optical add/drop multiplexer module.

As further explained, the second modular block includes a plurality of optical ports, wherein each optical port supports a plurality of individual optical receive signals and a plurality of individual optical transmit signals. The second modular block is configured such that the plurality of optical ports are divided into a first group of optical ports and a second group of optical ports, wherein each one of the optical ports in the first group of optical ports is in communication with each one of the optical ports in the second group of optical ports, and each one of the optical ports in the second group of optical ports is in communication with each one of the optical ports in the first group of optical ports.

Using the first and second modular blocks it is possible to establish interconnection between multiple degrees and multiple add/drop units, and to do so in a modular fashion.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. An apparatus comprising:
a multi-slot receptacle;
a first modular optical interconnect block, disposed in one slot of the multi-slot receptacle, comprising a plurality of optical ports, wherein each one of the optical ports of the first modular optical interconnect block is, respectively, in optical communication with each of the other optical ports of the first modular optical interconnect block; and
a second modular optical interconnect block, disposed in a second slot of the multi-slot receptacle, comprising a plurality of optical ports, wherein the plurality of optical ports of the second modular optical interconnect block are divided into a first group of optical ports and a second group of optical ports, wherein each one of the optical ports in the first group of optical ports is in communication with each one of the optical ports in the second group of optical ports, and each one of the optical ports in the second group of optical ports is in communication with each one of the optical ports in the first group of optical ports.

2. The apparatus of claim 1, wherein each optical port supports four optical receive signals.

3. The apparatus of claim 1, wherein each optical port supports four optical transmit signals.

4. The apparatus of claim 1, wherein the apparatus is configured to interconnect a degree-4 optical node and at least one optical add/drop multiplexer module.

5. The apparatus of claim 1, further comprising a plurality of second modular optical interconnect blocks disposed in respective slots, wherein the apparatus is configured to interconnect a degree-4 optical node including at least nine optical add/drop multiplexer modules.

6. The apparatus of claim 5, wherein the apparatus is configured to interconnect 13 optical add/drop multiplexer modules.

7. The apparatus of claim 1, wherein the apparatus comprises a plurality of the first modular optical interconnect blocks and a plurality of the second modular optical interconnect blocks, and the apparatus is configured to interconnect a degree-8 optical node including at least one optical add/drop multiplexer module.

8. The apparatus of claim 7, wherein the apparatus is configured to support a degree-8 node including at least 5 optical add/drop multiplexer modules.

9. The apparatus of claim 7, wherein the apparatus is configured to support a degree-8 node including at least 9 optical add/drop multiplexer modules.

10. The apparatus of claim 7, wherein the apparatus is configured to support a degree-8 node including at least 25 optical add/drop multiplexer modules.

11. The apparatus of claim 1, wherein the apparatus is disposed in a reconfigurable optical add/drop multiplexer node.

12. An apparatus comprising:
a modular optical patch panel; and
a plurality of optical switching complexes in optical communication with the modular optical patch panel;
wherein the modular patch panel comprises:
a multi-slot receptacle;
a first modular optical interconnect block, disposed in one slot of the multi-slot receptacle, comprising a plurality of optical ports, wherein each one of the optical ports of the first modular optical interconnect block is, respectively, in optical communication with each of the other optical ports of the first modular optical interconnect block; and
a second modular optical interconnect block, disposed in a second slot of the multi-slot receptacle, comprising a plurality of optical ports, wherein the plurality of optical ports of the second modular optical interconnect block are divided into a first group of optical ports and a second group of optical ports, wherein each one of the optical ports in the first group of optical ports is in communication with each one of the optical ports in the second group of optical ports, and each one of the optical ports in the second group of optical ports is in communication with each one of the optical ports in the first group of optical ports.

13. The apparatus of claim 12, wherein each optical port supports four optical receive signals.

14. The apparatus of claim 12, wherein each optical port supports four optical transmit signals.

15. The apparatus of claim 12, wherein the apparatus is operable as a degree-4 optical node with at least one optical add/drop multiplexer module.

16. The apparatus of claim 12, further comprising a plurality of second modular optical interconnect blocks disposed in respective slots, wherein the apparatus is operable as a degree-4 optical node with at least nine optical add/drop multiplexer modules.

17. The apparatus of claim 16, wherein the apparatus is configured to interconnect 13 optical add/drop multiplexer modules.

18. The apparatus of claim 12, wherein the apparatus comprises a plurality of the first modular optical interconnect blocks and a plurality of the second modular optical interconnect blocks, and the apparatus is operable as a degree-8 optical node with at least one optical add/drop multiplexer module.

19. The apparatus of claim 18, wherein the apparatus is configured to support a degree-8 node including at least 5 optical add/drop multiplexer modules.

20. The apparatus of claim 12, wherein the apparatus is a reconfigurable optical add/drop multiplexer node (ROADM).

* * * * *